Sept. 2, 1941.   C. P. DEIBEL   2,254,474
FLASHLIGHT AND BATTERY UNIT THEREFOR
Filed April 3, 1940
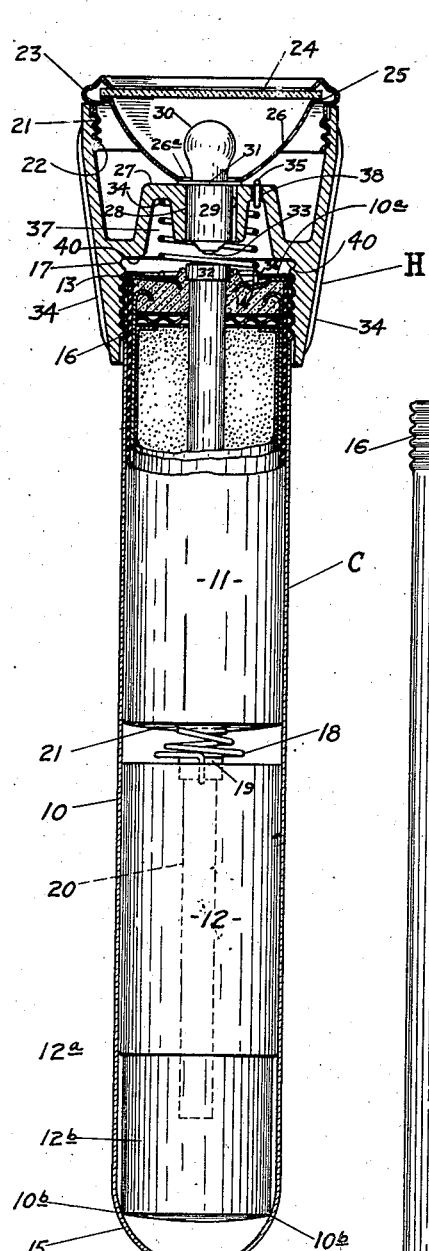
Fig. 2
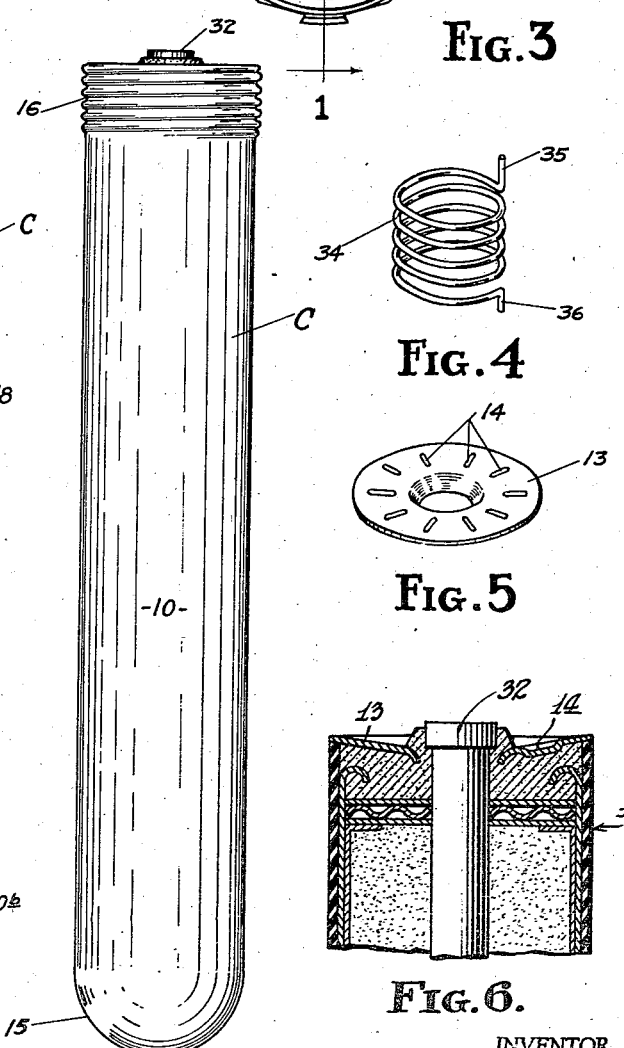
Fig. 1
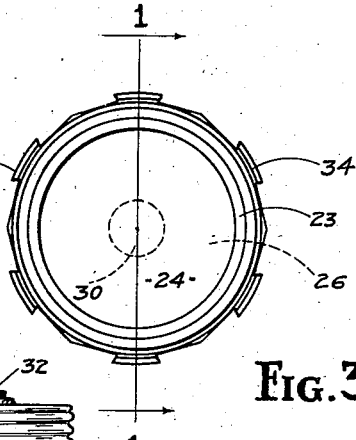
Fig. 3
Fig. 4
Fig. 5
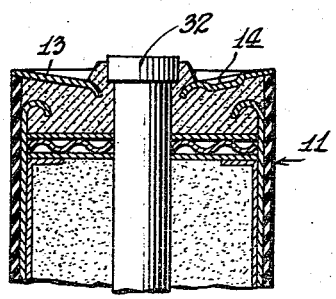
Fig. 6.
INVENTOR.
CYRIL P. DEIBEL
BY Hull, West & Chilton
ATTORNEYS.

Patented Sept. 2, 1941

2,254,474

UNITED STATES PATENT OFFICE 2,254,474

FLASHLIGHT AND BATTERY UNIT THEREFOR

Cyril P. Deibel, Lakewood, Ohio

Application April 3, 1940, Serial No. 327,651

3 Claims. (Cl. 136—110)

This invention relates to certain new and useful improvements in flashlights and battery units therefor and more particularly to a flashlight unit which will eliminate the necessity for a flashlight case altogether. Conventional flashlights now generally known usually comprise a case to receive one or more dry cells and a head removably attached to the case, the head carrying a lamp, reflector, and lens and suitable electrical connections for connecting the lamp with the dry cells. With the conventional flashlight construction any leakage of the cells causes corrosion, and when the time comes to change the batteries considerable difficulty is frequently experienced in removing the corroded dry cells from the case usually resulting in destruction of the case altogether.

One of the objects of this invention therefore is to obviate this difficulty due to corrosion of the dry cells within the case by eliminating the conventional case and providing a dry cell structure or battery unit which may be detached from the head, discarded and replaced by a new dry cell unit.

Another object of the invention is to provide a battery unit for flashlights which is self-contained and which is adapted to detachably receive a flashlight head and which may be discarded when desired, the battery unit providing the handle for the flashlight.

Another object of the invention is to provide a dry cell unit which is leak proof and of rugged and dependable construction and which can be economically manufactured in quantity production.

Another object of the invention is to eliminate the necessity for the conventional switch. This is accomplished by bringing the cell unit into direct contact with the lamp when desired and to provide means for preventing accidental movement of the cell unit relative to the head.

The various features of novelty whereby my invention is characterized will be hereinafter pointed out; but, for a full understanding of my invention and of its objects and advantages, reference may be had to the following detailed description taken in connection with the accompanying drawing, wherein Fig. 1 is a view in side elevation of my improved dry cell unit per se; Fig. 2 is a central vertical section through an assembled flashlight incorporating the features of my improvement; Fig. 3 is an end elevation of Fig. 2, looking towards the head or lamp end of the flashlight; Fig. 4 is a perspective detail view of the coil spring mounted between the head and cell unit to prevent accidental movement between these members; Fig. 5 is a perspective detail of the metal disk or cover for the dry cell unit; and Fig. 6 is an enlarged sectional view showing the details of construction of the top cell.

The flashlight construction herein disclosed comprises two principal members hereinafter referred to generally as the head H and cell unit C. As best illustrated in Fig. 2, the cell unit C here shown comprises a metal container 10 and which is preferably of a diameter and length suitable to receive two dry cells designated 11 and 12, but it is to be clearly understood that the container 10 may be made of a size or shape suitable for receiving any desired number of dry cells without departing from the spirit of my invention.

The dry cells 11 and 12 may be of a construction identical with the cell disclosed in my United States Patent No. 2,079,495 with the exception of the metal disk or cover 13 which is supplied with a plurality of radially spaced depressions 14 the purpose of which will hereinafter appear.

The container 10 is preferably a metal can having one end closed and somewhat bullet shaped, as shown at 15, and its other end open and supplied with an external thread 16 which is received by an internal thread 17 formed in the skirt portion of the head H which is preferably formed of metal. The dry cells 11 and 12 are inserted within the container 10 in a carbon to zinc relation or, in other words, in series with one another my means of a helical spring 18. One end of this spring is received by a hole drilled in the metal cap 19 on the carbon electrode 20 of the dry cell 12 in the manner shown in Fig. 2, while its other end bears against the zinc bottom 21 of dry cell 11. The cell unit C is preferably assembled as follows: Dry cell 12 carrying the helical spring 18 is inserted endwise within the container 10 and then the dry cell 11 is inserted endwise within the container until its zinc bottom 21 comes into contact with the spring. A slight pressure is then exerted upon the cell 11 to move it toward cell 12, thus slightly compressing the spring 18 and with the cells retained in this position within the container 10 with the spring 18 slightly compressed, the open end of the container is spun over as at 10ª to thereby hold the cells 11 and 12 within the container. It will be noted from an inspection of Fig. 1 that the lower end of insulating jacket 12ª of cell 12 is removed or cut away to permit the metal shell 12b to contact the semispherical end 15 of the outer container 10 as indicated at 10b.

Referring now in detail to the head H and for the present to Fig. 2, the head preferably comprises a metal casting supplied with an internal thread 17 in its skirt portion for the purpose of receiving the threaded end of cell unit C as before described. The head is further provided with an internal thread 21 near its outer end which receives the external thread 22 of a ring or bezel 23. This ring 23 serves to hold the lens 24 (which may be made of Lucite or the like) against the flange 25 of a reflector 26. An internal centrally disposed boss 27 cast integral with the head H is provided with a bore 28 to receive the shank 29 of an electric lamp 30. The lamp 30, commonly called "pre-focused," has a flange 31 which is held between the horizontal surface of the boss 27 and the inner flanged end of the reflector 26 when the bezel 23 is screwed home within the head H.

From the description thus far given it will be apparent that the head H is assembled by inserting the shank 29 of the lamp 30 within the bore 28 until its flange 31 comes to rest upon the horizontal surface of the said boss 27. Then the opening 26a of a reflector 26 is inserted over the lamp 30, the lens then being placed upon the reflector and finally the bezel or ring 23 screwed into the head which effectively retains these parts in rigid relation relative to one another. In order to complete the electrical connection to the lamp 30 the head H is screwed down upon the cell unit C until the cap 32 contacts the central electrode 33 of lamp 30 which completes the circuit. To facilitate turning of the head H relative to the cell unit C, ribs or fluted projections 34 may be formed on the head. The flutes also serve to prevent the flashlight from rolling when placed upon any level surface such as a desk, table top or the like. The movement of the head axially relative to the cell unit constitutes the switch which makes and breaks the circuit to the lamp.

Means for preventing accidental rotation of the head H upon the cell unit C will now be described. A coil spring 34 shown in detail in Fig. 4 has its ends bent at right angles to its convolutions to supply vertical projections 35 and 36. This spring is received within a recess 37 formed internally of the boss 27 and its projection 35 is passed through a hole 38 in said boss and made fast thereto, as clearly shown in Fig. 2, while the projecting portion 36 bears against the metal disk or cover 13 and engages the radially spaced depressions 14 thereof. The construction is such that when the head H is intentionally rotated upon the cell unit C, the projection 36 of the spring 34 will ride in and out of the depressions 14 of the disk 13, but the tension of the spring 34 is sufficient to maintain the projection 36 within one of the depressions 14 to prevent accidental rotation of the head upon the cell unit.

Should the head H be screwed entirely home upon the cell unit C or until the flange 10a of container 10 bears against the shoulder 40, no damage to the lamp 30 will take place due to the fact that when the cap 32 contacts the electrode 33 any further movement of the head upon the cell unit C will merely compress the spring 18 between the dry cells 11 and 12.

From the foregoing description, it will be seen that I have provided a unique flashlight construction the cell unit C of which may be readily attached or detached from the head H and which cell unit can be discarded when the dry cells are no longer useful and replaced by a new cell unit without the trouble of removing the dry cells from the container 10 inasmuch as this is all part of one unit. The exterior of the container 10 may be given any desired finish so as to match the head H or in contrast therewith as has recently become the accepted practice. Furthermore, while I have shown and described the head H as consisting of a metal casting, I wish to point out that it may be desirable to mold it from plastic, in which event an electrical conductor would be necessary within the head to conduct the current from the shank 29 of the lamp 30 to the cell unit C.

It will now be clear that I have provided a flashlight and battery unit therefor which will accomplish the objects of the invention as hereinbefore stated. Various changes may be made in the details of construction and arrangement of parts without departing from the spirit of my invention and the embodiment of the invention herein disclosed is to be considered as illustrative only and not in a limiting sense as the invention in its broader aspect is limited only in accordance with the scope of the appended claims.

Having thus described my invention, what I claim is:

1. A dry cell battery unit for flashlights comprising a metal shell, a plurality of dry cells slidably fitting within said shell in superposed relation and electrically connected with each other, one of said cells being grounded to said shell and the other cell or cells being insulated therefrom, the upper end of said shell being open and exteriorly threaded so as to detachably receive thereover a flashlight head and having the peripheral edge thereof bent over inwardly to hold said cells in place.

2. A dry cell battery unit for flashlights comprising a metal shell, a plurality of dry cells slidably fitting within said shell in superposed relation and electrically connected with each other, one of said cells being grounded to said shell and the other cell or cells being insulated therefrom, the upper end of said shell being open and exteriorly threaded so as to detachably receive thereover a flashlight head and having the peripheral edge thereof bent over inwardly to hold said cells in place, the uppermost cell having a centrally disposed electrode normally extending beyond the plane of the upper end of said metal shell and spring means urging said upper cell outwardly, said metal shell being shaped and adapted to serve as a handle for a flashlight.

3. A dry cell battery unit for flashlights comprising a metal shell, a plurality of dry cells slidably fitting within said shell in superposed relation and electrically connected with each other, one of said cells being grounded to said shell and the other cell or cells being insulated therefrom, the upper end of said shell being open and exteriorly threaded about its peripheral portion so as to detachably receive thereover a flashlight head, and means integrally connected with the upper end of said shell and extending inwardly thereof for holding said cells in place.

CYRIL P. DEIBEL.